(12) United States Patent
Saito

(10) Patent No.: US 8,355,816 B2
(45) Date of Patent: Jan. 15, 2013

(54) ACTION TEACHING SYSTEM AND ACTION TEACHING METHOD

(75) Inventor: Fuminori Saito, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 248 days.

(21) Appl. No.: 12/921,291

(22) PCT Filed: Feb. 3, 2009

(86) PCT No.: PCT/JP2009/051741
§ 371 (c)(1),
(2), (4) Date: Sep. 7, 2010

(87) PCT Pub. No.: WO2009/113339
PCT Pub. Date: Sep. 17, 2009

(65) Prior Publication Data
US 2011/0010009 A1    Jan. 13, 2011

(30) Foreign Application Priority Data
Mar. 10, 2008  (JP) .................................. 2008-058957

(51) Int. Cl.
*G05B 19/18* (2006.01)
(52) U.S. Cl. ......... 700/253; 700/118; 700/125; 700/259
(58) Field of Classification Search .................. 700/253, 700/259, 118, 125; 901/46, 47
See application file for complete search history.

(56) References Cited

U.S. PATENT DOCUMENTS

| | | | | |
|---|---|---|---|---|
| 4,396,903 A * | 8/1983 | Habicht et al. | ................. | 382/103 |
| 7,027,651 B2 * | 4/2006 | Simon et al. | ................. | 382/217 |
| 7,903,883 B2 * | 3/2011 | Zitnick et al. | ................. | 382/225 |

(Continued)

FOREIGN PATENT DOCUMENTS

EP    1 043 642 A2    10/2000

(Continued)

OTHER PUBLICATIONS

Corey Goldfeder, et al.: "Grasp Planning via Decomposition Trees", IEEE Int. Conference on Robotics and Automation, Apr. 13, 2007, Rome, IT.

(Continued)

*Primary Examiner* — Khoi Tran
*Assistant Examiner* — Jorge Peche
(74) *Attorney, Agent, or Firm* — Kenyon & Kenyon LLP

(57) ABSTRACT

To make it possible to teach a grasping action for a work object whose shape and 3D position are unknown to a robot by an intuitive and simple input operation by an operator. a captured image of the working space is displayed on a display device; (b) an operation in which a recognition area including a part of a work object to be grasped by a hand is specified in two dimensions on an image of the work object displayed on the display device is received; (c) an operation in which a primitive shape model to be applied to the part to be grasped is specified from among a plurality of primitive shape models; (d) a parameter group to specify the shape, position, and posture of the primitive shape model is determined by fitting the specified primitive shape model onto 3D position data of a space corresponding to the recognition area; (e) a grasping pattern applicable to grasping of the work object is selected by searching a database in which grasping patterns applicable by a hand to primitive shape models are stored.

8 Claims, 9 Drawing Sheets

U.S. PATENT DOCUMENTS

| | | | |
|---|---|---|---|
| 7,925,068 B2 * | 4/2011 | Hoctor et al. | 382/132 |
| 2002/0181780 A1 * | 12/2002 | Simon et al. | 382/209 |
| 2007/0058046 A1 * | 3/2007 | Kagei | 348/208.14 |
| 2009/0074238 A1 * | 3/2009 | Pfister et al. | 382/100 |

FOREIGN PATENT DOCUMENTS

| | | |
|---|---|---|
| JP | 1283603 A | 11/1989 |
| JP | 200394367 A | 4/2003 |
| JP | 2003256025 A | 9/2003 |
| JP | 2004-188533 A | 7/2004 |
| JP | 2004333422 A1 | 11/2004 |
| JP | 2005111618 A | 4/2005 |
| JP | 2007-219765 A | 8/2007 |

OTHER PUBLICATIONS

Roland T. Chin, et al.: "Model-Based Recognition in Robot Vision", ACM Computing Surveys, vol. 18, No. 1, Mar. 1986, pp. 67-108.

* cited by examiner

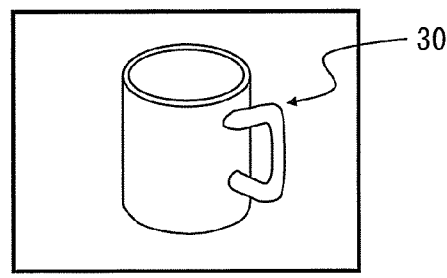
Fig. 3A
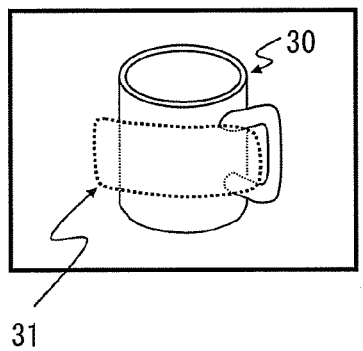 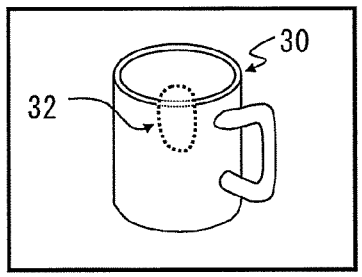 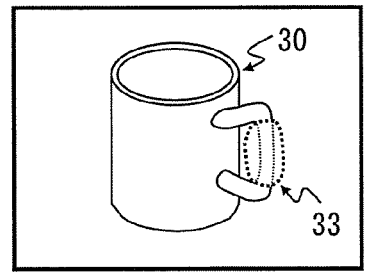
Fig. 3B　　　　　　　Fig. 3C　　　　　　　Fig. 3D

15

HAND TYPE: PLANAR HAND WITH TWO THREE-JOINT FINGERS

PRIMITIVE SHAPE MODEL: HOLLOW CYLINDER

GRASPING PATTERN A:
　　SIDE-FACE PINCHING GRASP

APPLICABLE CONDITIONS:
　　D<=100 AND L>=10

GRASPING PATTERN B:
　　END-FACE PINCHING GRASP

APPLICABLE CONDITIONS:
　　D<=150 AND L>=10 AND T>=5

① ②

ACTION TEACHING SYSTEM AND ACTION TEACHING METHOD

This is a 371 national phase application of PCT/JP2009/051741 filed 03 Feb. 2009, claiming priority to Japanese Patent Applications No. JP 2008-058957 filed 10 Mar. 2008, the contents of which are incorporated herein by reference.

TECHNICAL FIELD

The present invention relates to an action teaching system and an action teaching method to teach actions to a robot that grasps a work object.

BACKGROUND ART

Techniques in which shape models of work objects are provided to a robot in advance so that the robot recognizes a work object existing in the working space and automatically grasps the work object have been studied and developed (for example, see Patent document 4). However, although such model-based techniques can be implemented in working spaces in which the types of work objects are limited, it is substantially impossible to apply them to real environments with complex conditions such as ordinary living environments.

Meanwhile, techniques in which an operator teaches actions to a robot have been known (for example, see Patent documents 1 to 3). Patent documents 1 to 3 disclose techniques in which an operator teaches actions to a robot by using an action teaching apparatus with a graphic display function.

The invention disclosed in Patent document 1 has been made by the inventors of the present application. That invention relates to an action teaching apparatus that teaches actions in a 3D (three-dimensional) space to a robot by using an action teaching apparatus with a 2D (two-dimensional) display. This action teaching apparatus is applicable to a situation where a robot grasps a work object whose shape and 3D position in the working space are unknown. Teaching to a robot by using this action teaching apparatus is performed in the following manner.

Firstly, a picked-up image in which an image of the working space of a robot including a work object is taken is displayed in a 2D display. An operator draws a geometric element on the display surface of the display by making full use of a parametric modeling technique used in CAD (Computer Aided Design) or a similar technique with an input device such as a mouse or a touch panel while looking at the 2D display where the picked-up image is displayed. Specifically, in order to create a model of the shape of the work object, the operator adjusts the position, posture, and shape parameters of the model so that they are matched with those of the work object image on the screen, and establishes a coordinate system in which translation and rotation are applied as necessary with reference to the coordinate system of the position of the center of gravity of the work object model so that the work object can be easily grasped. By adapting the coordinate system of the end effector for grasping a work object provided at the leading end of the robot arm (herein called "tool coordinate system") to the coordinate system established in this manner, it is possible to make the robot grasp the work object. Note that 3D positions of the points and the geometric elements drawn by the operator are measured by a range measuring device such as a laser rangefinder and a stereo camera.

Patent document 2 discloses an action teaching apparatus including a storage unit that stores a shape model of the shape of an end effector provided at the leading end of a robot arm, and a display that displays the shape of the end effector. The action teaching apparatus: (1) receives the designation of a point on the end effector by an operator on the display screen where the shape of the end effector is displayed; (2) calculates a 3D position of the designated point; (3) receives an input of a posture change centered on the designated point by the operator; and (4) adjusts the posture of the end effector based on the 3D position of the designated point and the received posture change. That is, the action teaching apparatus of Patent document 2 is used to support the operator's work to input a posture change of the end effector whose position and shape are already known by graphic display. However, the action teaching apparatus of Patent document 2 cannot be used to teach operations for a work object whose shape and 3D position are unknown to the robot.

Patent document 3 discloses an action teaching apparatus to teach a work point of a work object whose shape and 3D position are already known to a robot by using graphic display. For example, if the work object is a car body, the action teaching apparatus is used to teach welding work points on the body. The action teaching apparatus of Patent document 3 also includes a storage device in addition to the graphic display. The storage device stores shape data of a work object obtained by polyhedron approximation based on a world coordinate system, i.e., coordinate system common to both the robot and the work object. The action teaching apparatus accesses the storage device, displays the shape of the work object in two dimensions in the graphic display, and receives designation of a work surface and a work point of the work object by an operator on the display screen. Then, the action teaching apparatus superimposes and displays the posture of the robot on the graphic display. Further, after receiving correction for the posture of the robot by the operator, the action teaching apparatus determines the posture of the robot, transforms the determined posture onto the robot coordinate system, and teaches it to the robot.

[Patent Document 1]
Japanese Unexamined Patent Application Publication No. 2003-256025
[Patent Document 2]
Japanese Unexamined Patent Application Publication No. 2005-111618
[Patent Document 3]
Japanese Unexamined Patent Application Publication No. 1-283603
[Patent Document 4]
Japanese Unexamined Patent Application Publication No. 2004-333422

DISCLOSURE OF INVENTION

Technical Problem

As described above, in the action teaching apparatus disclosed in Patent document 1, which is used to teach operations for a work object whose shape and 3D position are unknown to a robot, an operator conducts teaching to the robot by carrying out 3D drawing work used in the CAD while looking at a 2D display. However, the operator needs to acquire a lot of skill in order to perform the 3D drawing work used in the CAD, and thus it is not easy for ordinary users who are not skilled in the drawing technique using the CAD.

The present invention has been made based on the above-described inventor's knowledge, and an object of the present invention is to provide an action teaching system and an action teaching method capable of teaching a grasping action for a work object whose shape and 3D position are unknown to a robot by an intuitive and simple input operation by an operator.

Technical Solution

A first aspect of the present invention is an action teaching system to teach a grasping action to a robot having a robot arm including a hand to grasp a work object. The action teaching system includes: an image-pickup device; a range measuring device that measures a distance to an object; a display device; an input device that receives an input operation by an operator; and a database in which grasping patterns are stored, the grasping patterns being applicable by the hand to a plurality of prime shape models. Furthermore, the action teaching system also includes picked-up image display means, recognition area specifying means, prime shape model specifying means, fitting means, and grasping pattern selection means.

The picked-up image display means displays a picked-up image of a working space including the work object obtained by the image pickup device on the display device.

The recognition area specifying means receives an operation to specify a part of the work object to be grasped by the hand as an operation to specify a recognition area including the part in two dimensions on an image of the work object displayed on the display device by using the input device.

The prime shape model specifying means receives an operation to specify a prime shape model to be applied to the part from among the plurality of prime shape models through the input device.

The fitting means performs fitting the prime shape model specified by the operator onto 3D position data of a space corresponding to the recognition area obtained by using the range measuring device.

The grasping pattern selection means selects at least one grasping pattern applicable to grasping of the work object by searching the database based on the prime shape model specified by the operator and a fitting result by the fitting means.

Further, a second aspect of the present invention is an action teaching method to teach a grasping action to a robot having a robot arm including a hand to grasp a work object. The action teaching method includes the following steps (a) to (e):

(a) a step of displaying a picked-up image of a working space including the work object on a display device;

(b) a step of receiving an operation to specify a part of the work object to be grasped by the hand as an operation to specify a recognition area including the part in two dimensions on an image of the work object displayed on the display device;

(c) a step of receiving an operation to specify a prime shape model to be applied to the part from among a plurality of prime shape models;

(d) a step of fitting the prime shape model specified in the step (c) onto 3D position data of a space corresponding to the recognition area obtained by using a range measuring device; and (e) a step of selecting at least one grasping pattern applicable to grasping of the work object by searching a database based on the prime shape model specified in the step (c) and a fitting result in the step (d), the database storing grasping patterns which are applicable by the hand to the plurality of prime shape models.

In accordance with the above-described first and second aspects of the present invention, an operator can intuitively specify a part of a work object to be grasped through an operation to specify a recognition area in two dimensions on a picked-up image displayed on the display device and an operation to select a prime shape model the operator wants to apply to the recognition area. Further, since first and second aspects of the present invention use a database in which prime shape models are associated with grasping patterns applicable to those prime shape models, a suitable grasping pattern candidate(s) can be presented to the operator. Therefore, the operator can teach a way of grasping to a robot without meticulously specifying the overall position and posture of the robot hand and the configuration of fingers possessed by the robot hand and the like.

Note that an action teaching system in accordance with the above-described first aspect of the present invention may further include grasping pattern display means and grasping pattern decision means. The grasping pattern display means displays the at least one grasping pattern selected by the grasping pattern selection means on the display device. Further, the grasping pattern decision means receives an operation by the operator that is used to select the final grasping pattern the robot should perform based on display contents generated by the grasping pattern display means, and also receives an operation by the operator that is used to adjust the degree of freedom left in the final grasping pattern.

In addition, the grasping pattern display means may display a model image of the hand representing the at least one grasping pattern over the picked-up image. Further, the grasping pattern decision means may receive an adjustment operation for the degree of freedom by the operator through a dragging operation of the model image within the display screen of the display device, and determine an adjustment value of the degree of freedom based on the position and posture of the model image within the display screen after the dragging operation. With a configuration like this, the operator can determine a suitable grasping pattern and teach it to the robot by a simple dragging operation.

Further, in the above-described first aspect of the present invention, grasping pattern selection means may further determine interference between the track of the robot arm based on the at least one grasping pattern and an obstacle(s) around the work object by using 3D position data in the periphery of the recognition area obtained by using the range measuring device, and narrow down the grasping pattern based on the decision result. In this way, it is possible to obtain a more suitable way of grasping in which interference with an obstacle(s) around the work object is avoided.

Advantageous Effects

The present invention can provide an action teaching system and an action teaching method capable of teaching a grasping action for a work object whose shape and 3D position are unknown to a robot by an intuitive and simple input operation by an operator.

BRIEF DESCRIPTION OF DRAWINGS

FIG. 3A shows an example of a picked-up image including a work object to be displayed in a display device, and FIGS. 3B to 3D show examples of designation of a recognition area on a display screen;

EXPLANATION OF REFERENCE

1 ROBOT
10 ROBOT ARM
11 HAND
12 IMAGE PICKUP DEVICE
13 RANGE MEASURING DEVICE
14 COMMUNICATION UNIT
15 DATABASE
2 TEACHING TERMINAL
20 COMMUNICATION UNIT
21 DISPLAY DEVICE
22 INPUT DEVICE
23 CONTROL UNIT
30 WORK OBJECT IMAGE
31-33 RECOGNITION AREA
40 ICON LIST
41-44 ICON
50 3D POSITION DATA
90 WORK OBJECT
60 PRIME SHAPE MODEL (SOLID CYLINDER MODEL)
70 HOLLOW CYLINDER MODEL
83 HAND MODEL
84 POINTER
RF DEGREE OF ROTATIONAL FREEDOM
TF DEGREE OF TRANSLATIONAL FREEDOM

BEST MODE FOR CARRYING OUT THE INVENTION

Specific exemplary embodiments to which the present invention is applied are explained hereinafter with reference to the drawings. The same signs are assigned to the same components throughout the drawings, and duplicated explanation is omitted as appropriate for clarifying the explanation.

First Exemplary Embodiment

Figure 1:
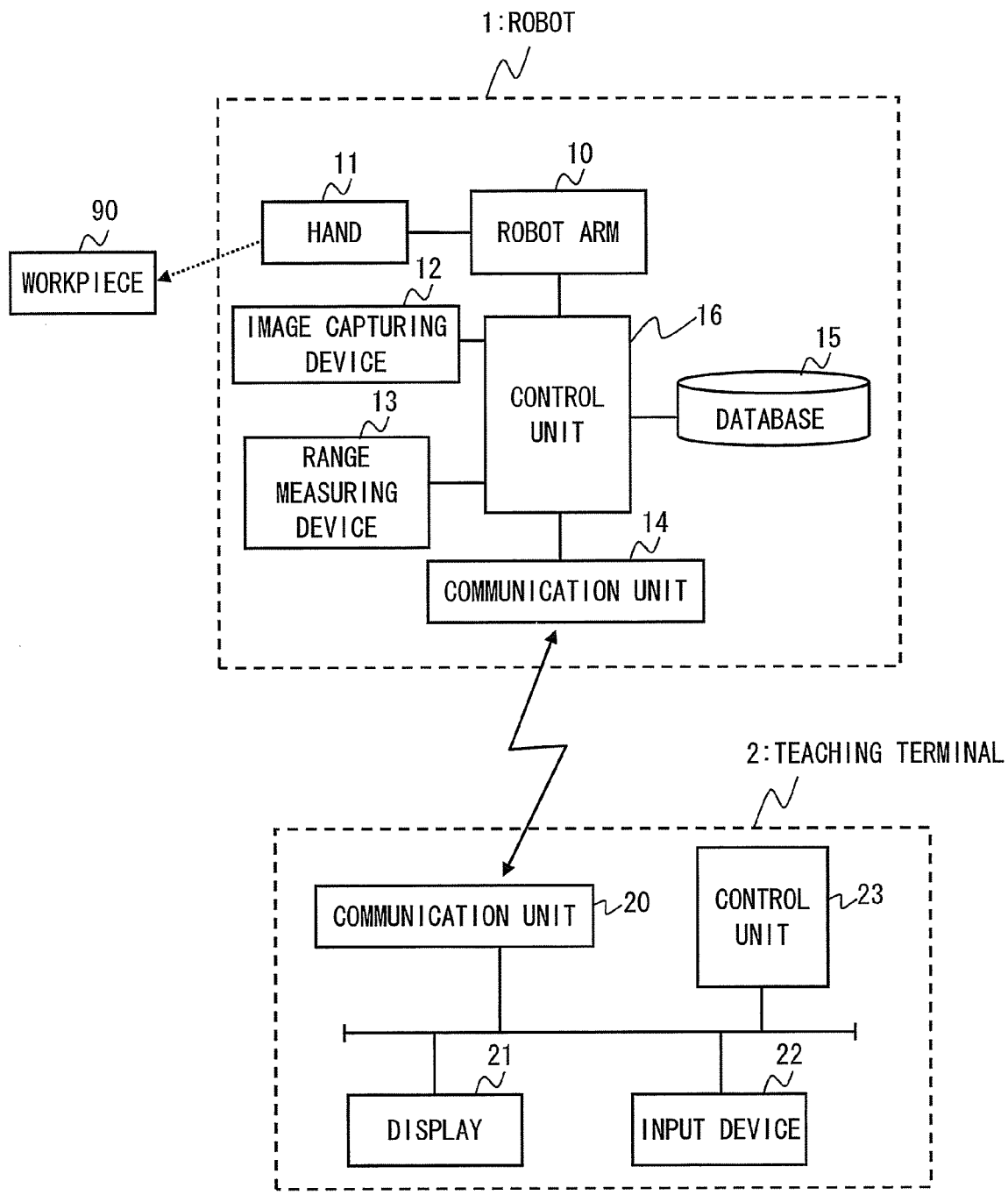
FIG. 1 is a block diagram illustrating an action teaching system in accordance with a first exemplary embodiment of the present invention.

FIG. 1 is a block diagram illustrating an overall configuration of an action teaching system in accordance with this exemplary embodiment. An action teaching system in accordance with this exemplary embodiment includes a robot 1 that performs a grasping action for a work object 90, and a teaching terminal 2 that is used to teach a grasping action to the robot 1. Configurations of the robot 1 and the teaching terminal 2 are explained hereinafter.

A robot 1 shown in FIG. 1 includes a multi-joint robot arm 10 that is composed of a plurality of links connected with each other by joints. A hand 11 to grasp a work object 90 is provided at the leading end portion of the robot arm 10.

An image pickup device 12 obtains a picked-up image by taking an image of a working space in which the robot 1 and the work object 90 are placed. Note that as described later, a picked-up image obtained by the image pickup device 12 is output to the display screen of the teaching terminal 2 and presented to an operator. Therefore, for example, the image pickup device 12 may be a camera equipped with an image pickup element sensitive to the visible light range such as a CCD (Charge Coupled Device) image sensor and a CMOS (Complementary Metal Oxide Semiconductor) image sensor.

A range measuring device 13 measures a distance to an object in the working space. There are no particular restrictions on the measuring principle of the range measuring device 13, and various commonly-known techniques can be applied. For example, a laser range finder, a light projection stereo range measuring device, or a stereo camera or the like may be used as the range measuring device 13. Note that if the range measuring device 13 itself can take an image, e.g., if the range measuring device 13 is a stereo camera, the image pickup device 12 and the range measuring device 13 can be constructed as a dual-purpose single device.

A communication unit 14 transmits a picked-up image obtained by the image pickup device 12 and other information relating to the action teaching to/from a communication unit 20 on the teaching terminal 2 side. Commonly-known wireless or wired communication methods may be applied as a communication method for the communication unit 14. Further, the communication unit 14 and the communication unit 20 do not necessarily have to be connected directly with each other, and they may be connected through a LAN (Local Area Network), the Internet, or a mobile phone communication network or the like.

The database 15 is a database in which a plurality of prime shape models and a plurality of grasping patterns are recorded in such a manner that the prime shape models are associated with the grasping patterns. The grasping pattern is data describing an action pattern including positions and postures of fingers possessed by the hand 11. Further, the prime shape model is a model of a 3D geometric element such as a solid cylinder, a quadratic prism, and hollow cylinder. As described later, the prime shape model is presented to an operator using the teaching terminal 2 as a shape candidate of a part of the work object 90 to be grasped. For example, by designating a given prime shape model and searching the database 15 with that prime shape model, it is possible to know at least one grasping pattern applicable to that prime shape model. Conversely, by designating a given grasping pattern and searching the database 15 with that grasping pattern, it is possible to know at least one prime shape model applicable to that grasping pattern. A configuration example of the database 15 and specific examples of action patterns and prime shape models are explained later.

A control unit 16 performs action control of the robot arm 10 and the hand 11. In addition, the control unit 16 performs control in regard to the grasping action teaching to the robot 1 in cooperation with the teaching terminal 2 and carries out data processing. Specifically, the control unit 16 performs image pickup control for the image pickup device 12, measurement control for the range measuring device 13, data transmission/reception using the communication unit 14, access to the database 15, a fitting process between 3D point group data measured by the range measuring device 13 and a prime shape model, and so on.

The control unit 16 may be constructed by using one or more CPUs (Central Processing Units), a control program to be executed by the CPU, a RAM (Random Access Memory) used as a temporary storage area for calculation data and the like, and a nonvolatile memory such as an EEPEOM (Electrically Erasable and Programmable Read Only Memory) that stores the control program and control data and the like. Needless to say, the control program may be a set of a plurality of program modules.

Note that in action teaching to the robot 1 by using the teaching terminal 2, which is described later, it is necessary that relative relations between a plurality of coordinate systems, specifically, relative relations between a camera coordinate system in regard to an image pickup space of the image pickup device 12, an image coordinate system of a picked-up image by the image pickup device 12, a measurement space coordinate system in regard to a measurement space of the range measuring device 13, a tool coordinate system established in the hand 11, and a world coordinate system fixed at a working space are known in advance. A calibration may be carried out in order to determine the relative relations between these coordinate systems.

Next, each component of the teaching terminal 2 shown in FIG. 1 is explained hereinafter. As described previously, the communication unit 20 performs data transmission with the communication unit 14 on the robot 1 side.

A display device 21, which is a device capable of displaying graphics, displays a picked-up image by the image pickup device 12, a prime shape model, and a hand model representing a grasping pattern under the control of a control unit 23, which is explained later. For example, a LCD (Liquid Crystal Display) or a CRT (Cathode Ray Tube) display or the like may be used for the display device 21.

An input device 22 is a device that receives an operation input to the teaching terminal 2 by an operator. The input device 22 may be a pointing device capable of specifying an input position or coordinates on the screen of the display device 21 according to an operation by a part of the body of the operator such as a hand and a foot, or a voice of the operator or the like. Specifically, a mouse, a touch panel, a voice input device, or a laser pointer or the like may be used for the input device 22.

A control unit 23 performs control in regard to grasping action teaching to the robot 1 and data processing in cooperation with the control unit 16 on the robot 1 side. Specifically, the control unit 23 performs display control for the display device 21, acquisition and analysis of operations at the input device 22, data transmission/reception using the communication unit 20, and so on. Similarly to the control unit 16, the control unit 23 may be constructed by using one or more CPUs (Central Processing Units), a control program to be executed by the CPU, a RAM (Random Access Memory) used as a temporary storage area for calculation data, and a nonvolatile memory and the like.

Note that the teaching terminal 2 is preferably equipped with a battery to supply operating power to each of the above-described components and constructed as an integral-type compact terminal so that an operator can easily carry it with him/her. However, the configuration of the teaching terminal 2 is not limited to an integral-type like that. For example, the teaching terminal 2 may be constructed by using a communication terminal, an LCD, a mouse, and a PC (Personal Computer) and the like, all of which are independent devices.

Figure 2:
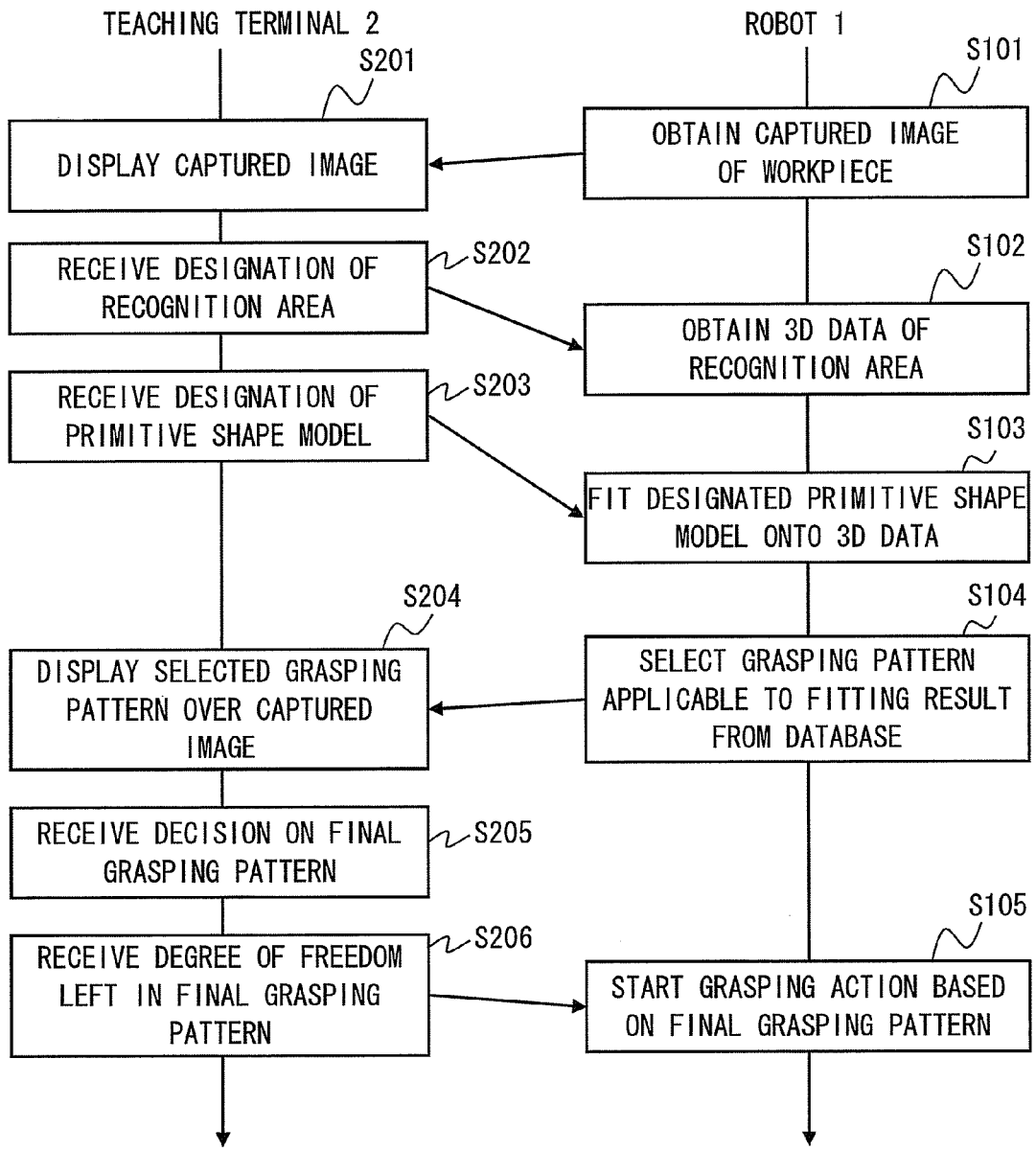
FIG. 2 is a flowchart showing an action teaching procedure by an action teaching system in accordance with a first exemplary embodiment of the present invention.

Next, details of a teaching procedure for a grasping action for the robot 1 by an action teaching system in accordance with this exemplary embodiment of the present invention is explained hereinafter. FIG. 2 is a flowchart showing an action teaching procedure by an action teaching system in accordance with this exemplary embodiment. In FIG. 2, steps S101 to S105 represent processes carried out on the robot 1 side, and steps S201 to S206 represent processes carried out on the teaching terminal 2 side.

In a step S101, the robot 1 obtains a picked-up image of a working space including a work object 90 by using the image pickup device 12. The obtained picked-up image is transferred to the teaching terminal 2. Note that the system may be configured such that the position and posture as well as the angle of view of the image pickup device 12 at the time when a picked-up image is obtained can be remotely controlled from the teaching terminal 2. A suitable picked-up image of the working space including the work object 90 can be obtained, and teaching of a suitable grasping pattern to the robot 1 becomes easier.

In a step S201, the teaching terminal 2 displays the picked-up image obtained in the step S101 on the display device 21. FIG. 3A is an example of a screen displaying a picked-up image including an image 30 of the work object 90. Note that the following explanation is made by using an example where the work object 90 is a cup with a handle like the one shown in FIG. 3A.

In a step S202, the teaching terminal 2 receives designation of a range to be recognized as "recognition area" within the picked-up image displayed on the display device 21 from the operator through the input device 22. Note that "recognition area" means an area that is defined within a picked-up image by an operator to specify a part of a work object 90 that should be grasped by the hand 11. The recognition area is used for the recognition by the range measuring device 13, i.e., as a target area of the range measurement in a step S102, which is explained later.

FIGS. 3B to 3D show examples of display screens of the display device 21 including recognition areas specified on the display screens. A recognition area 31 displayed in FIG. 3B specifies a trunk portion of the cup. A recognition area 32 displayed in FIG. 3C specifies a brim portion of the cup opening. A recognition area 33 displayed in FIG. 3D specifies a handle portion.

In order to make operator's intuitive operations possible, the teaching terminal 2 may receive the designation of a recognition area by an operator through operations of a pointer displayed over the picked-up image displayed in the display device 21. For example, to receive the designation of the recognition area 31 shown in FIG. 3B, an operation in which a closed curve representing the outer circumference of the recognition area 31 is drawn by a pointer may be received. Such an operation is an extremely intuitive operation when the input device 22 is, for example, a touch panel. That is, by disposing a touch panel directly above the display screen of the display device 21, an operator can draw a recognition area by directly touching the displayed work object age 30 with his/her finger or a touch pen or the like.

Figure 4:
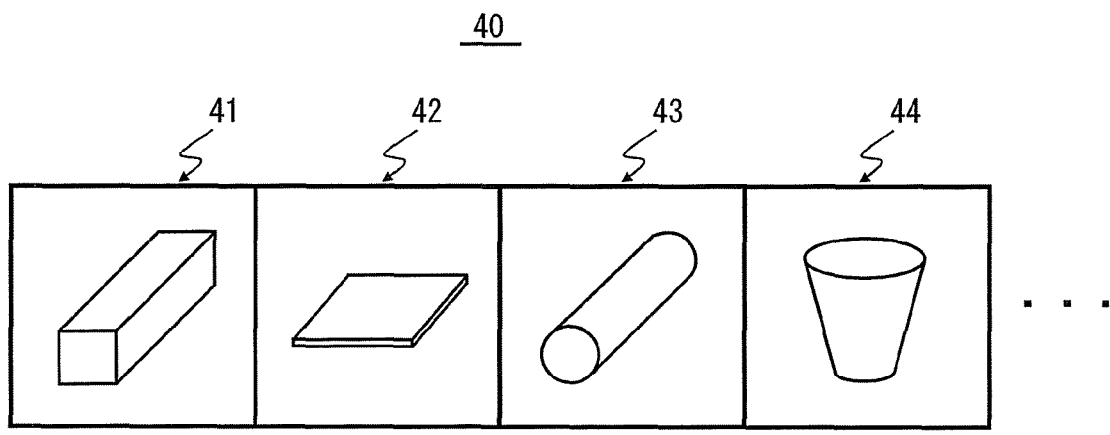
FIG. 4 shows an example of an icon list used to select a prime shape model.

In a step S203, the teaching terminal 2 receives the designation of a prime shape model that should be applied to the recognition area through the input device 22. That is, the operator specifies what kind of 3D geometric shape the recognition area designated by the operator himself/herself should has by using the input device 22. The teaching terminal 2 preferably outputs, for example, an icon list 40 like the one shown in FIG. 4 to the display device 21 in order to urge the user to select a prime shape model. Each of Icons 41 to 44 shown in FIG. 4 represents an example of prime shape model. The icons 41, 42, 43, and 44 are a quadratic prism model, a plate model, a solid cylinder model, and a truncated cone model respectively. Each of the prime shape models has shape parameters to define a shape and a size, and disposition parameters to define a position and a posture. Note that needless to say, the types of prime shape models are not limited to those shown in FIG. 4, and other various shapes such as a super ellipsoid, an L-shaped prism, a C-shaped solid cylinder and the like may be prepared according to the types of work objects 90.

Figure 5:
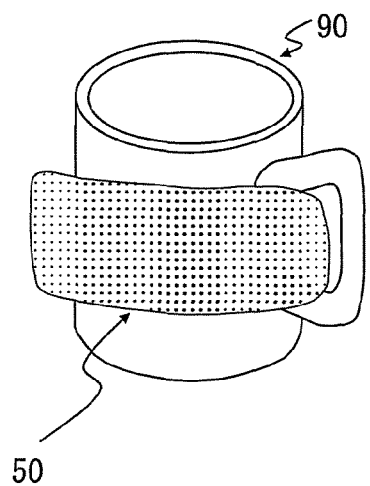
FIG. 5 is a conceptual diagram for explaining acquisition of 3D position data in regard to a recognition area.

In a step S102, the robot 1 receives data representing the recognition area designated by the operator from the teaching terminal 2. Then, the robot 1 obtains point group data representing the 3D position of the working space corresponding to the recognition area (hereinafter called "3D position data") by using the range measuring device 13. FIG. 5 is a conceptual diagram showing acquisition of 3D position data 50 of the working space corresponding to the recognition area 31 shown in FIG. 3B. The 3D position data obtained in the step S102 represents the depth of the working space including the work object 90 when viewed from the robot 1.

The robot 1 may carry out measurement from a plurality of viewpoints by controlling the position and posture of the range measuring device 13. By merging 3D position data obtained by measurement from a plurality of viewpoints, it is possible to obtain a number of point groups representing the depth of the work object 90. For example, a coordinate system whose origin point is located at a 3D position within the working space corresponding to the center of the recognition area is preferably established, and the viewpoint of the range measuring device 13 is preferably moved in two directions composed of horizontal and vertical directions. Although 3D position data of areas other than the recognition area defined by the operator are also obtained due to the change of the viewpoint, only the 3D position data within a cone-shaped space created by connecting a viewpoint at the initial position of the range measuring device 13 and the edge of the recognition area is preferably left and data other than this data is preferably deleted.

Figure 6:
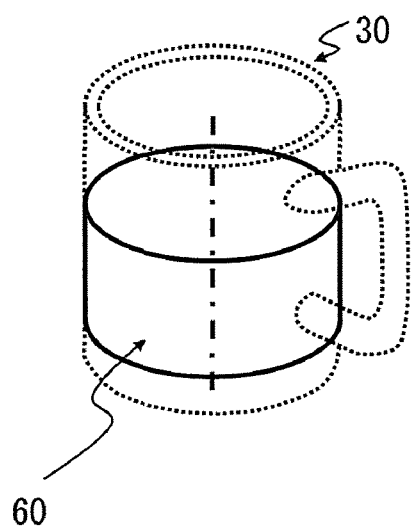
FIG. 6 is a conceptual diagram for explaining fitting of a prime shape model onto 3D position data.

At a step 103, the robot 1 receives data representing a prime shape model designated by the operator from the teaching terminal 2. Then, the robot 1 fits the prime shape model designated by the operator onto the 3D position data obtained in the step S102. More specifically, the robot 1 performs fitting for the shape parameters and disposition parameters of the designated prime shape model so that they are matched best with the 3D position data within the recognition area obtained by the measurement. Publicly-known techniques in the field of 3D image processing may be used for the fitting process in this step. FIG. 6 shows a fitting result when a user selects a solid cylinder model in which a prime shape model (specifically, a solid cylinder model) 60 is displayed over the image 30 of the work object 90.

In a step S104, the robot 1 selects a grasping pattern applicable to the prime shape model whose shape parameters have been determined by the fitting by referring to the database 15. A specific example for each of shape parameters of a prime shape model, a grasping pattern, and a data structure of a database 15 is explained hereinafter.

Figure 7:
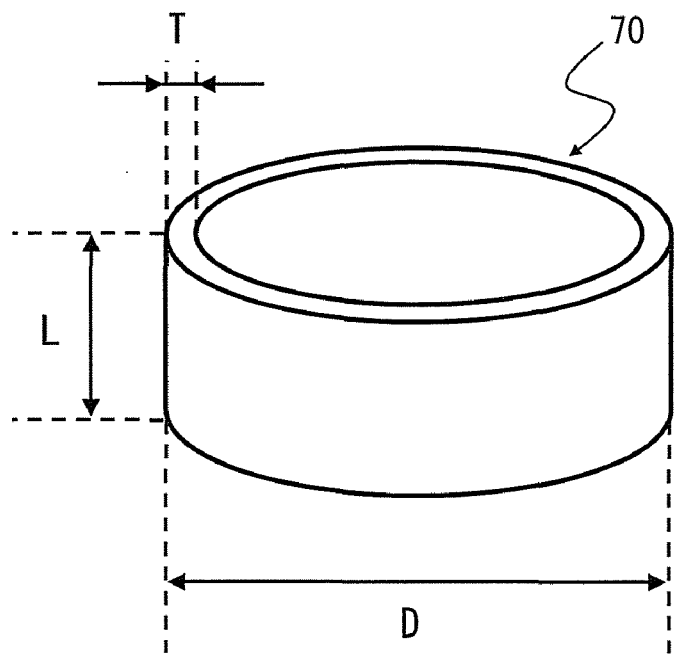
FIG. 7 shows a cylinder model, i.e., an example of a prime shape model and its shape parameters.

FIG. 7 shows a hollow cylinder model 70, which is one of the prime shape models. The shape parameters of the hollow cylinder model 70 include three parameters, i.e., a diameter D, a length of the cylinder L, and a thickness of the wall T. Note that the above-described solid cylinder model 60 is a subset of hollow cylinder model 70. Specifically, the solid cylinder model corresponds to a hollow cylinder model whose wall thickness T is not defined or T=D/2.

Figure 8:
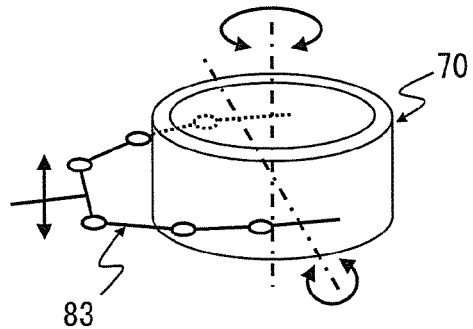
FIG. 8 shows a configuration example of a database possessed by an action teaching system in accordance with a first exemplary embodiment of the present invention.
Figure 8:
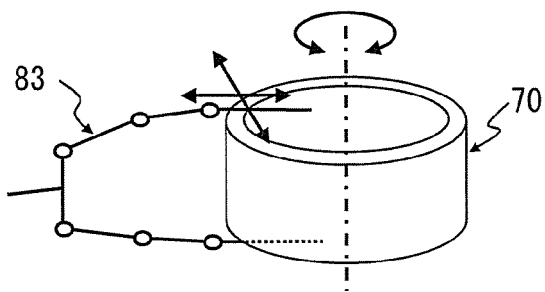
Figure 9:
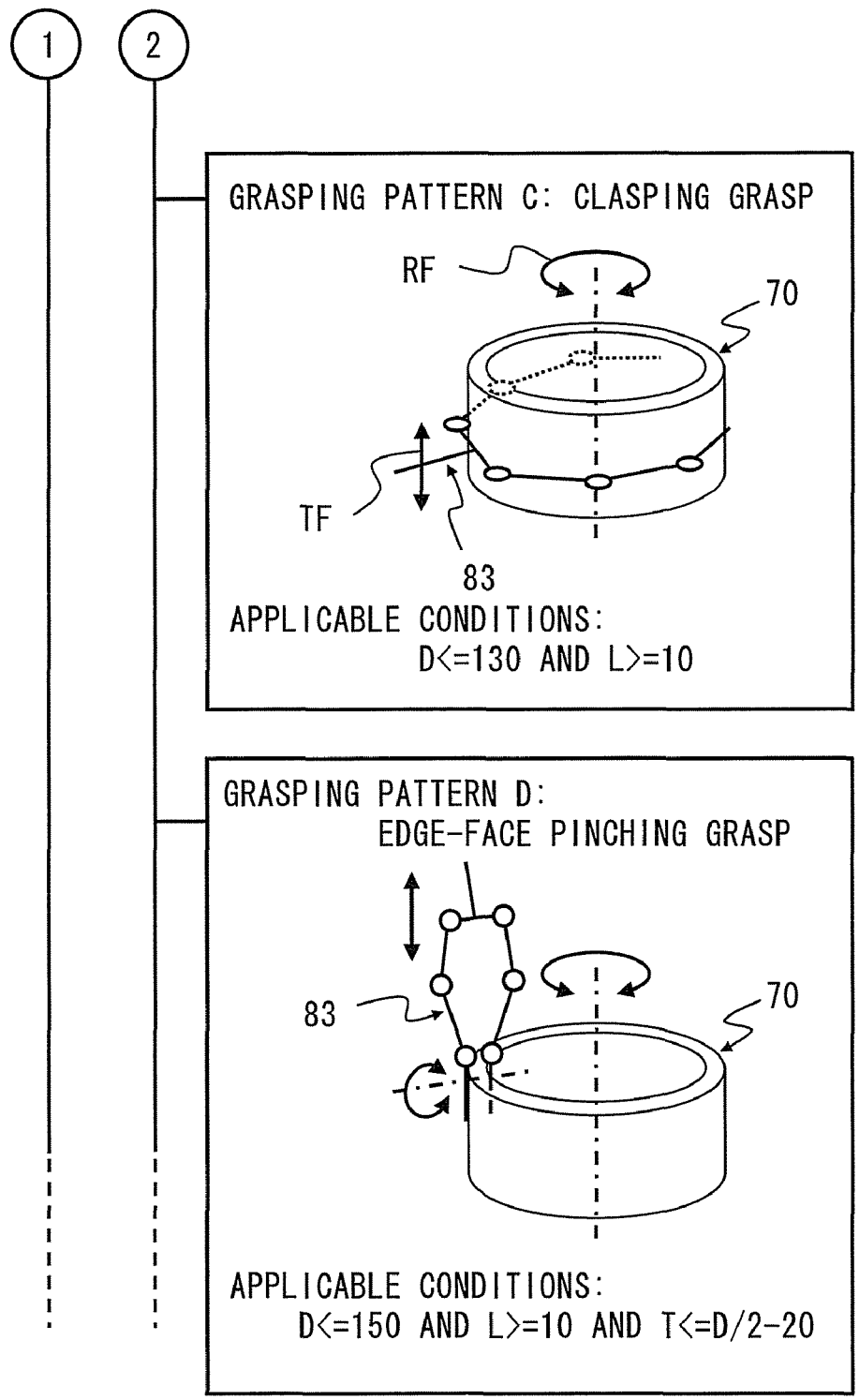
FIG. 9 shows a configuration example of a database possessed by an action teaching system in accordance with a first exemplary embodiment of the present invention.

FIGS. 8 and 9 are an example of a data structure of the database 15 and shows data contents in regard to grasping patterns applicable to the hollow cylinder model 70. Different grasping patterns become practicable depending on the type of the hand 11, and thus different grasping patterns become applicable even to the same prime shape model. The database 15 preferably records information indicating with what kind of shape parameter range of each prime shape model each grasping pattern is applicable in such a manner that they corresponds to the types of the hands 11.

In the examples shown in FIGS. 8 and 9, four grasping patterns are recorded with their applicable conditions as grasping pattern that are applicable when the hand type of the hand 11 is a "planar hand with two three-joint fingers" and the prime shape model is a hollow cylinder model. Specifically, the four grasping patterns are "grasping pattern A: side-face pinching grasp", "grasping pattern B: end-face pinching grasp", "grasping pattern C: clasping grasp", and "grasping pattern D: edge-face pinching grasp". The applicable conditions for each of these grasping patterns are described by using the shape parameters D, L, and T of the cylinder model 70 shown in FIG. 8.

Note that for the sake of reference, FIGS. 8 and 9 show perspective views representing the grasping patterns A to D by using the cylinder model 70 and a hand model 83 corresponding to the hand 11. Further, double-headed arrows indicating the grasping patterns A to D in the figures indicate remaining adjustable degrees of freedom of the respective grasping patterns. For example, in the case of "grasping pattern C: clasping grasp", two degrees of freedom, i.e., the degree of rotational freedom RF around the central axis and the degree of translational freedom TF along the central axis of the cylinder model 70 are adjustable. In this exemplary embodiment of the present invention, these degrees of freedom left in the grasping patterns are ultimately determined by the operator in a step S206, which is explained later.

The explanation is continued by referring to FIG. 2 again. In a step S204, the teaching terminal 2 superimposes and displays a prime shape model 60 representing the fitting result and a hand model 83 representing the grasping pattern selected in the step S104 over the picked-up image containing the image 30 of the work object 90. By performing display in a superimposed state like this, the operator can easily grasp the degree of matching between the work object 90 and the prime shape model and the grasping pattern.

Figure 10A:
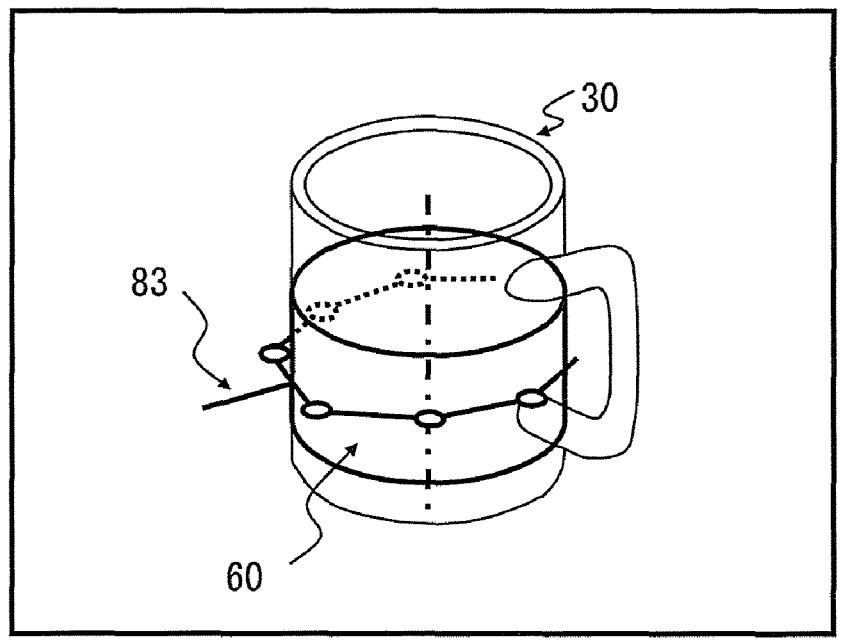
FIG. 10A shows an example of a screen of a display device on which a prime shape model and a grasping pattern are displayed over a picked-up image including a work object.
Figure 10B:
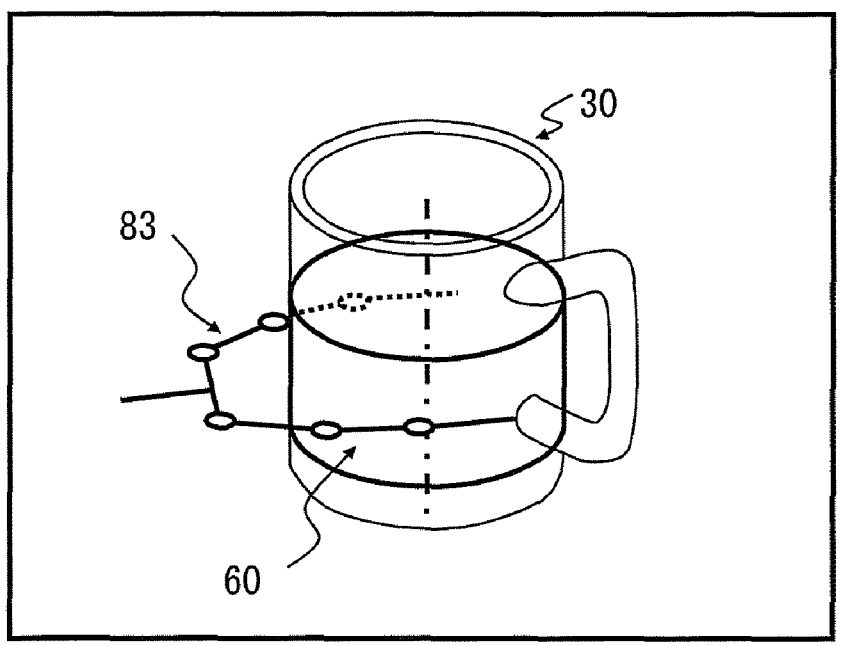
FIG. 10B shows an example of a screen of a display device on which a prime shape model and a grasping pattern are displayed over a picked-up image including a work object.

FIGS. 10A and 10B show examples of display screens of the display device 21 in the step S204. FIG. 10A is a display example of the above-described "grasping pattern C: clasping grasp". Further, FIG. 10B is a display example of the above-described "grasping pattern A: side-face pinching grasp". When there are two or more grasping patterns as shown in FIGS. 10A and 10B, the display device 21 may display these plural candidates side by side, or display these candidates one by one in response to operator's operation.

In a step S205, the teaching terminal 2 receives the final decision made by the operator. Note that the determined grasping pattern is called "final grasping pattern hereinafter.

In a step S206, the teaching terminal 2 urges the operator to adjust the degree of freedom left in the final grasping pattern. The teaching terminal 2 preferably displays a pointer on the screen of the display device 21 and receives a pointer operation by the operator. The operator adjusts the degree of freedom by operating the pointer. More specifically, the teaching terminal 2 preferably receives a dragging operation for the hand model 83 displayed on the screen. Then, the teaching terminal 2 may determine an adjustment value of the degree of freedom left in the final grasping pattern according to the relative position and relative posture between the hand model 83 and the prime shape model 60 or the work object image 30 after the dragging operation. In this way, the operator can determine a suitable grasping pattern by a simple dragging operation.

Figure 11A:
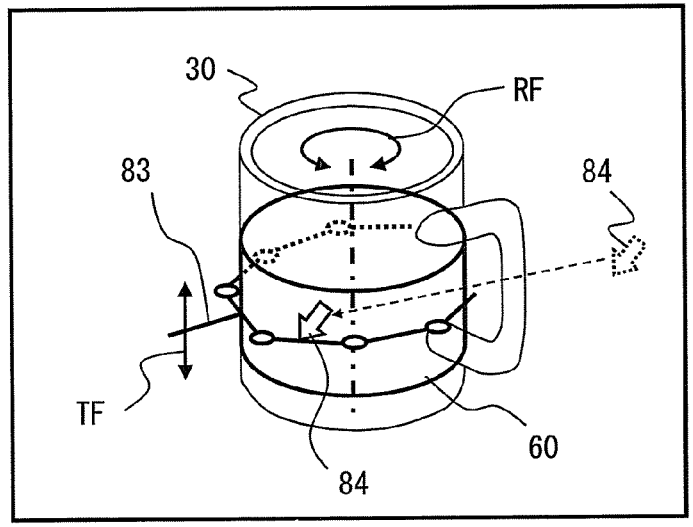
FIG. 11A shows an example of a screen of a display device used to adjust the degree of freedom of a grasping pattern.
Figure 11B:
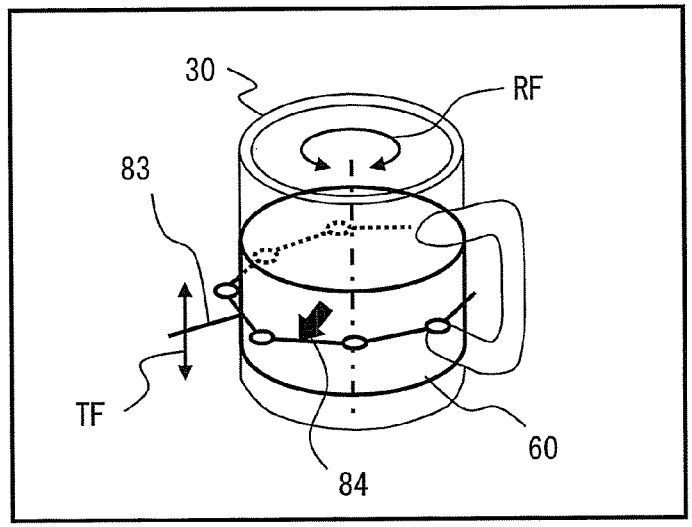
FIG. 11B shows an example of a screen of a display device used to adjust the degree of freedom of a grasping pattern.
Figure 11C:
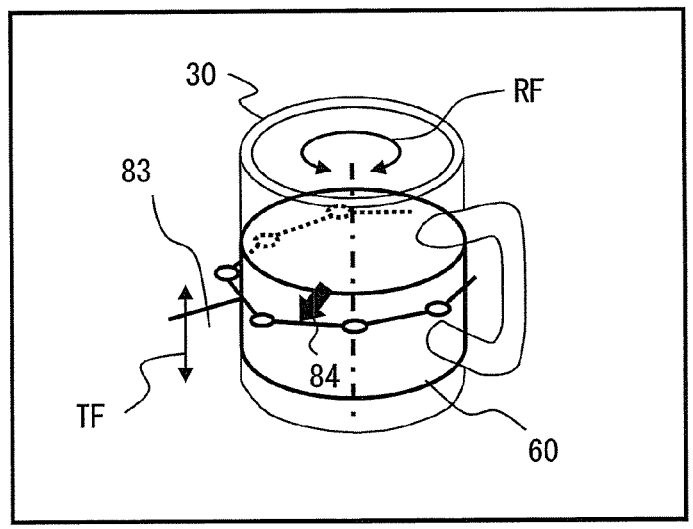
FIG. 11C shows an example of a screen of a display device used to adjust the degree of freedom of a grasping pattern.

FIGS. 11A to 11C show an example of an adjustment to the degree of freedom by the operator in the step S206. FIG. 11A shows a movement of a pointer 84 on the display screen. FIG. 11B shows a change of the displayed pointer 84 by the dragging of the hand model 83. Further, FIG. 11C shows a state where an adjustment has been made to the degree of translational freedom TF by the dragging operation.

Finally, in a step S105 of FIG. 2, the robot 1 performs a grasping action for the work object 90 based on the finally-determined grasping pattern.

An action teaching system in accordance with the above-described first exemplary embodiment of the present invention has following advantageous effects. That is, with an action teaching system in accordance with this exemplary embodiment, an operator can draw a recognition area on the display screen on which a picked-up image by the image pickup device 12 has been displayed, and specify the shape of a part of a work object 90 to be grasped by an operation to select a prime shape model to be applied to this recognition area and thereby determine a way of grasping. That is, the operator can teach a grasping action for a work object 90 by a simple and intuitive operation without carrying out any meticulous input operation requiring a lot of skill like the parametric modeling technique used in the CAD.

Further, an action teaching system in accordance with this exemplary embodiment can easily present suitable grasping pattern candidates to an operator by recording prime shape models and grasping patterns in advance in the database 15 in such a manner that the prime shape models are associated with the grasping patterns. That is, the operator does not need to minutely and meticulously specify the position and posture of the hand 11 as well as the configuration of each finger and the like.

Further, in an action teaching system in accordance with this exemplary embodiment, an operator designates a part to be grasped by the robot 1, and a model of only that part is created by applying a prime shape model. Therefore, a model of the object is easily created, and various grasping operation can be realized even without using any complex recognition technique.

Further, in general, in order to implement a grasping plan based on models, it is necessary to use detailed models according to the type of a work object 90. However, an action teaching system in accordance with this exemplary embodiment of the present invention implements a grasping plan by combining a limited number of prime shape models and grasping patterns, and therefore the amount of necessary data is small.

Further, since operations that an operator needs to carry out for the teaching terminal 2 are limited, the display device 21 and the input device 22 do not require a complex interface. That is, the teaching terminal 2 is suitable for operations carried out in a compact display screen. Therefore, it is also easy to use a compact portable terminal such as a smart phone and a compact video game with a communication function and the like as the teaching terminal 2.

Note that the robot 1 may determine interference between a track of the robot arm 10 and an obstacle(s) around the work object 90 (collision with an obstacle(s)) at the time when a grasping pattern selected based on a fitting result (step S104 of FIG. 2) is carried out. This decision may be made by comparison between 3D position data in the periphery of the recognition area obtained by the range measuring device 13 and a calculation result of the track of the robot arm 10. Further, the grasping pattern may be narrowed down based on a decision result on the interference with the obstacle. Specifically, any grasping patterns that could interfere with the obstacle may be specified, and those grasping patterns may be eliminated from the grasping pattern candidates that are transmitted to the teaching terminal 2 to be presented to the operator. Further, a decision result on the interference may be transmitted to the teaching terminal 2 to notify the operator of the fact that interference could occurs with an obstacle(s).

Other Exemplary Embodiments

As shown in FIG. 2, the first exemplary embodiment of the present invention has been explained on the assumption that after a grasping pattern is selected by fitting, the selected pattern is presented to an operator, and the operator determines the final grasping pattern and adjusts the degree of freedom of the final grasping pattern. A procedure like this is effective in order to bring an actual action of the robot 1 closer to the optimal grasping action. However, it is also possible to make the robot 1 perform a grasping action autonomously in accordance with one of the selected grasping patterns without carrying out the steps S204 to S206 of FIG. 2.

Further, functional assignments between the robot 1 and the teaching terminal 2 in the first exemplary embodiment are a merely an example. For example, the fitting between a prime shape model and 3D position data may be performed on the teaching terminal 2 side. Further, the database 15, for example, may be arranged on the teaching terminal 2 side. Furthermore, the system may include a third device in addition to the robot 1 and the teaching terminal 2. For example, the image pickup device 12 and the range measuring device 13 do not necessarily have to be directly installed in the robot body equipped with the robot arm 10 and the hand 11, and they may be provided in the working place as an independent device separate from the robot body.

Further, needless to say, the present invention is not limited to the above-described exemplary embodiments and various modifications can be made without departing from its scope and spirit.

Industrial Applicability

The present invention can be used for action teaching systems and action teaching methods to perform action teaching to a robot that grasps a work object.

The invention claimed is:

1. an action teaching system to teach a grasping action to a robot having a robot arm including a hand to grasp a work object, comprising:

an image-capturing device;

a range measuring device that measures a distance to an object;

a display device; an input device that receives an input operation by an operator;

a database in which grasping patterns are stored, the grasping patterns being applicable by the hand to a plurality of predetermined shape models;

means for displaying a captured image of a working space including the work object obtained by the image capturing device on the display device;

means for receiving an operation to specify a part of the work object to be grasped by the hand as an operation to specify a recognition area including the part in two dimensions on an image of the work object displayed on the display device by using the input device;

means for receiving an operation to specify a predetermined shape model to be applied to the part from among the plurality of predetermined shape models through the input device;

means for fitting the predetermined shape model specified by the operator onto 3D position data of a space corresponding to the recognition area obtained by using the range measuring device; and means for selecting at least one grasping pattern applicable to grasping of the work object by searching the database based on the predetermined shape model specified by the operator and a fitting result by the means for fitting.

2. the action teaching system according to claim 1, further comprising:

means for displaying the at least one grasping pattern selected by the means for selecting on the display device; and means for receiving an operation by the operator that is used to select a final grasping pattern the robot should perform based on display contents generated by the means for displaying, and an operation by the operator that is used to adjust a degree of freedom left in the final grasping pattern.

3. The action teaching system according to claim 2, wherein the means for displaying the at least one grasping pattern displays a model image of the hand representing the at least one grasping pattern over the captured image, and the means for receiving an operation by the operator receives an adjustment operation for the degree of freedom by the operator through a dragging operation of the model image within a display screen of the display device, and determines an adjustment value of the degree of freedom based on the position and posture of the model image within the display screen after the dragging operation.

4. The action teaching system according to claim 1, wherein the means for selecting further determines interference between a trajectory of the robot arm based on the at least one grasping pattern and an obstacle around the work object by using 3D position data in the periphery of the recognition area obtained by using the range measuring device, and narrows down the grasping pattern based on the decision result.

5. An action teaching method to teach a grasping action to a robot having a robot arm including a hand to grasp a work object, the action teaching method comprising:

(a) a step of displaying a captured image of a working space including the work object on a display device;

(b) a step of receiving an operation from an operator via an input device to specify a part of the work object to be grasped by the hand as an operation to specify a recognition area including the part in two dimensions on an image of the work object displayed on the display device;

(c) a step of receiving an operation from the operator via the input device to select a shape model to be applied to the part from among a plurality of predetermined shape models;

(d) a step of using a processor for fitting the selected shape model specified in the step (c) onto 3D position data of a space corresponding to the recognition area obtained by using a range measuring device; and (e) a step of selecting at least one grasping pattern applicable to grasping of the work object by searching a database based on the selected shape model specified in the step (c) and a fitting result in the step (d), the database storing grasping patterns which are applicable by the hand to the plurality of predetermined shape models.

6. The action teaching method according to claim 5, further comprising:

(f) a step of displaying the at least one grasping pattern selected in the step (e) on the display device;

(g) a step of receiving an operation by an operator that is used to select a final grasping pattern the robot should perform based on display contents generated in the step (f); and (h) a step of receiving an operation by the operator that is used to adjust a degree of freedom left in the final grasping pattern.

7. The action teaching method according to claim 6, wherein in the step (f), a model image of the hand representing the at least one grasping pattern is displayed over the captured image, and in the step (h), an adjustment operation for the degree of freedom by the operator is received through a dragging operation of the model image within a display screen of the display device, and an adjustment value of the degree of freedom is determined based on the position and posture of the model image within the display screen after the dragging operation.

8. The action teaching method according to claim 5, wherein in the step (e), interference between a trajectory of the robot arm based on the at least one grasping pattern and an obstacle around the work object is further determined by using 3D position data in the periphery of the recognition area obtained by using the range measuring device, and the grasping pattern is narrowed down based on the decision result.

* * * * *